United States Patent [19]

Gelbard et al.

[11] 4,147,037
[45] Apr. 3, 1979

[54] HIGH EFFICIENCY HEAT EXCHANGE FOR REFRIGERATION SUCTION LINE/CAPILLARY TUBE ASSEMBLY

[75] Inventors: Robert B. Gelbard; Raymond M. Schreck, both of Louisville, Ky.

[73] Assignee: General Electric Company, Louisville, Ky.

[21] Appl. No.: 879,543

[22] Filed: Feb. 21, 1978

Related U.S. Application Data

[63] Continuation-in-part of Ser. No. 736,111, Oct. 27, 1976, abandoned.

[51] Int. Cl.² .................. F25B 41/00; F25B 41/06
[52] U.S. Cl. ........................... 62/113; 62/511; 62/513; 62/527; 165/171; 138/140
[58] Field of Search .............. 138/40; 165/169, 171; 62/511, 513, 113, 527

[56] References Cited

U.S. PATENT DOCUMENTS

| | | | |
|---|---|---|---|
| 2,393,854 | 1/1946 | Carpenter | 138/40 |
| 2,687,626 | 8/1954 | Bartlowe | 62/511 |
| 2,776,552 | 1/1957 | Thomas | 62/513 |
| 3,269,459 | 8/1966 | Popovitch | 165/169 |
| 3,448,798 | 6/1969 | Coe | 165/168 |

FOREIGN PATENT DOCUMENTS

| | | | |
|---|---|---|---|
| 1156831 | 11/1963 | Fed. Rep. of Germany | 62/511 |
| 1189567 | 3/1965 | Fed. Rep. of Germany | 62/511 |
| 2001021 | 9/1971 | Fed. Rep. of Germany | 62/511 |

Primary Examiner—Lloyd L. King
Attorney, Agent, or Firm—Steven C. Schnedler; Frederick P. Weidner; Radford M. Reams

[57] ABSTRACT

A suction line/capillary tube assembly which provides improved heat exchange between the cool gaseous refrigerant conveyed by the suction line and the warm liquid refrigerant conveyed by the capillary tube in a refrigeration system. The assembly is generally characterized by the capillary tube being within and in direct thermal contact with the suction line wall along a substantial length thereof, which length is at least approximately two feet. In a first specific embodiment, the capillary tube is soldered to the inside of the suction line, as opposed to merely being loosely passed therethrough. In a second specific embodiment, an aluminum suction line is fabricated with an internal extruded channel defined between a pair of ridges extending from the interior surface of the suction line. A copper capillary tube is snugly positioned in the channel and preferably the ridges are deformed toward each other so as to substantially surround the capillary tube. In a method of providing a suction line/capillary tube assembly as contemplated by the second specific embodiment, the operation of deforming the ridges is accomplished by forcing a closure tool through the suction line. In a third specific embodiment, the capillary tube is snugly positioned within a longitudinal bore formed within the wall of the suction line.

4 Claims, 7 Drawing Figures

HIGH EFFICIENCY HEAT EXCHANGE FOR REFRIGERATION SUCTION LINE/CAPILLARY TUBE ASSEMBLY

CROSS REFERENCE TO RELATED APPLICATION

This is a continuation-in-part of application Ser. No. 736,111, filed Oct. 27, 1976 now abandoned.

BACKGROUND OF THE INVENTION

The present invention relates generally to heat exchangers and, more particularly, to a refrigeration system suction line/capillary tube assembly providing efficient heat exchange between the cool gaseous refrigerant conveyed by the suction line and the warm liquid refrigerant conveyed by the capillary tube. Additionally, the invention relates to a method for providing such an assembly.

It is well known in the art of refrigeration to provide heat exchange between the relatively cool refrigerant vapor conveyed from the evaporator outlet through the suction line to the compressor and the relatively warm liquid refrigerant conveyed from the condenser outlet through the capillary tube to the evaporator inlet. Such heat exchange improves the thermodynamic efficiency of the refrigeration system by cooling liquid refrigerant before it enters the evaporator. Basically, since the cold gaseous refrigerant passing through the suction line is warmed to at least ambient temperature as it passes from within the insulated space to the compressor inlet, the residual refrigeration effect of the cold suction line gas would otherwise be wasted (except for some beneficial compressor motor cooling extracted from the returning refrigerant). This heat exchange between gaseous and liquid refrigerant is often termed "suction line/capillary tube heat exchange." This terminology is for convenience used hereinafter, and is intended to mean heat exchange between the gaseous and liquid refrigerant, and not really heat exchange between sections of metallic tubing per se.

There are two prior art techniques generally used in the refrigeration art for providing a suction line/capillary tube assembly for heat exchange. The first technique is soldering the small diameter capillary tube to the outside of the suction line along a substantial length thereof to produce the suction line/capillary tube assembly. A problem with this method is that, due to the metallurgical bond required, compatability of the suction line material with the capillary tube material is a problem. Of two most commonly-employed materials, aluminum and copper, aluminum is the lower in cost. However, aluminum, while suitable for the suction line application, is generally unsuitable for the capillary tube application because the inside diameter of the capillary tube must be very small and controlled within tight tolerances. In most cases, copper, but not aluminum, is a satisfactory material for this tight tolerance application. It would therefore appear desirable to form the suction line of aluminum and the capillary tube of copper. However, forming a heat-conducting metallurgical bond between a copper and aluminum is difficult. Further, when dissimilar metals such as copper and aluminum are bonded and exposed to moisture, particularly atmospheric moisture, corrosion of the aluminum due to galvanic action occurs. The galvanic action, if not inhibited, eventually destroys the bond and the aluminum tubing. The result of all this is that where the capillary tube is soldered to the outside of the suction line, the capillary tube as well as the suction line must be copper rather than low-cost aluminum. A third possible material, steel, although low in cost, is not commonly used because of severe corrosion and handling problems.

An additional disadvantage to the first technique is a slight loss in thermodynamic efficiency due to heat loss from the capillary tube directly to the ambient. While at first it may appear that any heat lost by the capillary tube is beneficial, more heat can generally be transferred to the suction line gas than to ambient. This is because the suction line gas is normally cooler than ambient and therefore more heat is lost by the capillary tube if it is in heat exchange relationship only with the suction line gas. Additionally, in refrigerator constructions where the suction line/capillary tube assembly passes through the insulated wall space between the inner liner and the outer case, heat from the capillary tube, if not contained, can flow to the refrigerated space within the inner liner. This then adds to the work the refrigeration system must perform.

Where it is desired nevertheless to use a low-cost aluminum suction line in combination with a copper capillary tube, the second prior art technique for providing a suction line/capillary tube assembly for heat exchange is to pass the copper capillary tube inside the suction line in heat exchange relationship with the gaseous refrigerant passing therethrough. In the art, this is generally termed a "coaxial" heat exchange, although actually the capillary tube is not necessarily precisely centered within the suction line. The capillary tube may even contact the interior surface of the suction line at random points. Galvanic corrosion is not a problem because all points of contact between aluminum and copper are within the sealed refrigerant system and therefore not exposed to atmospheric moisture.

While the coaxial heat exchange effectively eliminates the material compatability problem and eliminates the problem of heat leakage from the capillary tube to ambient and to the cool interior of the refrigerator cabinet, the heat exchange between the capillary tube and gaseous refrigerant carried by the suction line is not as efficient as in the first method because the much greater heat exchange surface provided by using the interior wall of the suction line itself to heat exchange with the gaseous refrigerant is largely lost.

By the present invention, there is provided a suction line/capillary tube assembly which provides improved heat exchange efficiency and which permits the use of a low-cost aluminum suction line.

SUMMARY OF THE INVENTION

In its most general form, the present invention contemplates an assembly for heat exchange between the suction line gas and the capillary tube liquid in a refrigeration system characterized by the capillary tube being positioned within and in direct thermal contact with the suction line along a substantial length thereof, which length is at least approximately two feet. Compared to the prior art coaxial heat exchange, the present invention provides improved heat exchange with the suction line gas because it takes advantage of the interior surface of the suction line itself for increased contact area. This, of course, is also a characteristic of the prior art assembly wherein the capillary tube is soldered to the exterior of the suction line. However, the present invention provides an additional efficiency advantage in that heat flow between the warm capillary tube and the ambient is eliminated. Additionally, in those cases where the suction line/capillary tube assembly is routed through the insulation between the inner and outer walls of the refrigerator cabinet, undesirable warming of the refrigerated space between the cabinet is minimized. This of course requires the refrigeration system to operate less frequently. Additionally, in some forms of the invention, the suction line and the capillary tube can be formed from the metallurgically dissimilar metals aluminum and copper, respectively, without there being a material compatibility problem which could lead to galvanic corrosion.

The present invention further contemplates several specific embodiments of the suction line/capillary tube assembly. In the first embodiment, a capillary tube is soldered to the inside of a suction line, as opposed to merely being loosely passed therethrough as in the prior art coaxial heat exchange. While this embodiment in general requires the use of a more expensive copper or a steel suction line, it still attains the thermal efficiency advantages afforded by the invention.

A second specific embodiment of the invention contemplates an aluminum suction line fabricated with an internal extruded channel defined between a pair of ridges extending from the interior surface of the suction line generally toward the center thereof. A copper capillary tube is snugly positioned in the channel and preferably the ridges are deformed toward each other so as to substantially surround the capillary tube. This provides good thermal contact for efficient heat exchange. Galvanic corrosion does not occur because all areas of contact between dissimilar metals are isolated from moisture.

The present invention further contemplates a method for providing a suction line/capillary tube assembly as contemplated by the above-described second embodiment. The method includes the steps of providing a suction line having such a pair of longitudinal ridges forming a generally U-shaped channel and then placing the capillary tube within the channel. Next, the ridges are deformed so as to substantially surround the capillary tube. This operation of deforming the ridges is accomplished by forcing a closure tool through the suction line. The closure tool has a channel of tapering width on the exterior surface thereof and is oriented so that the ridges enter the wider end of the tool channel in undeformed condition and emerge from the narrower end of the tool channel in deformed condition.

A third specific embodiment of the assembly according to the present invention includes a longitudinal bore formed within the wall of a suction line. A capillary tube is snugly positioned within the bore in good thermal contact with the suction line. The longitudinal bore is isolated from both the ambient atmosphere and from the interior of the suction line, although occasional gaps in the wall between the longitudinal bore and the interior of the suction line tube would present no particular problem.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings in which:

DESCRIPTION OF THE PREFERRED EMBODIMENTS

Figure 1:
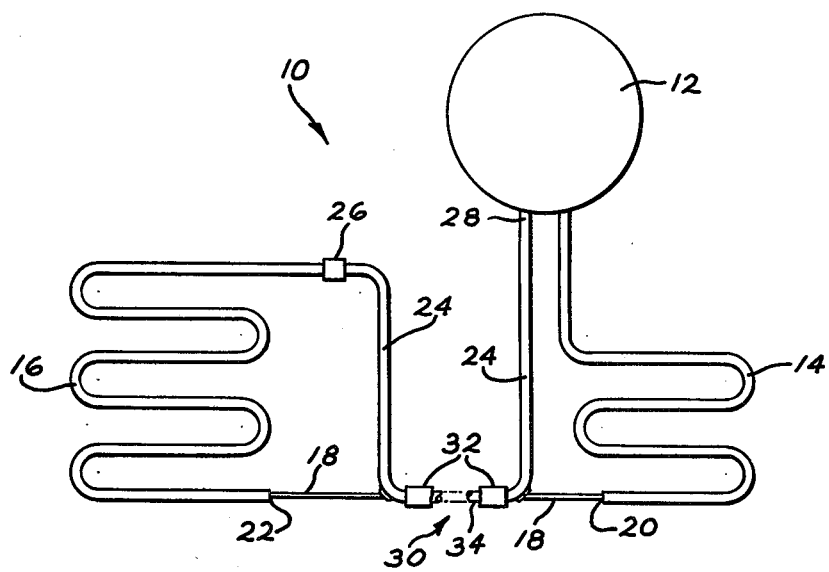
FIG. 1 is a schematic representation of a refrigeration system.

Referring first to FIG. 1, a closed-circuit refrigeration system 10 includes a compressor 12, a condenser 14 for cooling and condensing hot compressed gaseous refrigerant received from the compressor 12 to warm liquid refrigerant, and an evaporator 16 within which liquid refrigerant vaporizes to produce cooling. In the refrigeration system 10, a flow-restricting copper capillary tube 18 conveys the warm liquid refrigerant from the outlet 20 of the condenser 14 to the inlet 22 of the evaporator 16. Additionally, a suction line 24 conducts cool gaseous refrigerant from the outlet 26 of the evaporator 16 back to the inlet 28 of the compressor 12.

In order to provide heat exchange between the warm liquid refrigerant conveyed by the capillary tube 18 and the cool gaseous refrigerant conveyed by the suction line 24, thereby to improve the efficiency of the refrigeration system 10, a suction line/capillary tube assembly 30 is formed by bringing the suction line 24 and capillary tube 18 together, in a manner hereinafter described in detail, for a portion of their respective lengths.

As is known to those skilled in the art of refrigeration, when applied to a household refrigerator, the suction line/capillary tube assembly 30 is usually four to six feet in length and extends between the compressor 12 and condenser 14, typically physically located together in a compartment (not shown) in the uninsulated portion of the refrigerator, and the evaporator 16 which is physically located in the insulated portion of the refrigerator. For convenience of illustration, most of the relatively long midportion of the suction line/capillary tube assembly 30 is omitted in the drawing, as indicated by the broken lines. The major portions of both the capillary tube 18 and the suction line 24 are included within the suction line capillary tube assembly 30, the remaining portions of the capillary tube 18 and the suction line 24 shown outside the suction line/capillary tube assembly 30 being relatively smaller portions.

As mentioned above, the suction line/capillary tube assembly 30 is usually four to six feet in length. This length is typically that which is necessary to physically reach between the compressor 12 and condenser 14 at one end, and the evaporator 16 at the other end. Additionally, this length provides sufficient beneficial heat exchange for improved thermodynamic efficiency. For shorter suction line/capillary tube assembly lengths, less heat exchange occurs. Eventually, a lower limit is reached beyond which, as a practical matter, the cost of providing a heat exchange structure is not worth the minimal efficiency advantage gained. Approximately two feet is considered to be the lower practical limit. Accordingly, the heat exchange assemblies of the present invention are at least approximately two feet in length.

Depending upon the particular cabinet construction, the suction line/capillary tube assembly 30 may pass through the wall insulation space between the inner liner and outer case of the refrigerator cabinet (not shown). The space refrigerated by the evaporator is of course defined by the inner liner. Portions of the suction line/capillary tube assembly 30, particularly where it passes completely outside of the refrigerator cabinet, may be covered by a layer of thermal insulation material 32.

Figure 2:
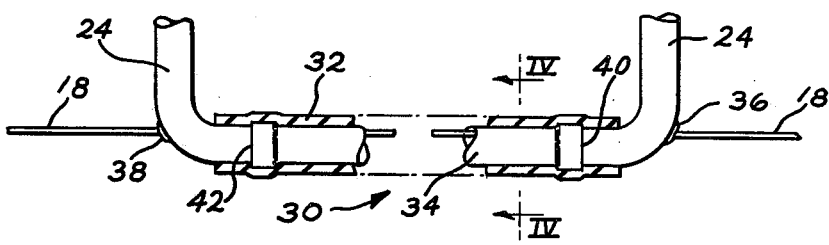
FIG. 2 is an enlarged view of a portion of the refrigeration system of FIG. 1, showing the suction line/capillary tube assembly.

Referring next to FIG. 2, an enlarged view of the suction line/capillary tube assembly 30 is shown. FIG. 2 is intended to show only general details of construction of the suction line/capillary tube assembly 30 without showing the specific details for promoting heat exchange between the capillary tube 18 and the gaseous refrigerant carried by the suction line 24. Detailed descriptions of various heat exchange devices are presented hereinafter with particular reference to the embodiments of the invention shown in FIGS. 4–7.

From FIG. 2, it will be apparent that the capillary tube 18 lies generally within a midsection 34 of the suction line 24. To permit the capillary tube 18 to pass from outside to the interior of the suction line midsection 34 and back outside again, the capillary tube 18 is simply inserted at connections 36 and 38 through suitable apertures in the suction line 24. Either conventional silver soldering or brazing is employed to seal the connections 36 and 38. It will be understood that the connections 36 and 38 are exemplary only, as numerous devices are known in the art for passing a capillary tube from the exterior to the interior of a capillary tube. As an example of a particular variation, the connection at 38 may be associated with the entry portion of a well-known single-entry evaporator.

To make the connections 36 and 38 between the capillary tube 18 and the suction line 24 requires that the portion of the suction line 24 at which the connections are made be copper or steel so that a metallurgical bond by silver soldering or brazing can be accomplished. To permit the use of a low-cost aluminum suction line over most of the length of the suction line/capillary tube assembly 30, the midsection 34 may be formed of aluminum and suitably adhesively bonded at connections 40 and 42 to copper extensions of the suction line 24 leading to the compressor inlet 28 and the evaporator outlet 26, respectively. Although other connections are possible, the adhesive type connections 40 and 42 provide a low-cost, high integrity method of connecting dissimilar metals that cannot be brazed. Further, the connections 40 and 42 are sufficiently localized that they may be reliably protected from atmospheric moisture by a heat shrinkable plastic sleeve or a plastic coating, if needed in the specific application.

Figure 3:
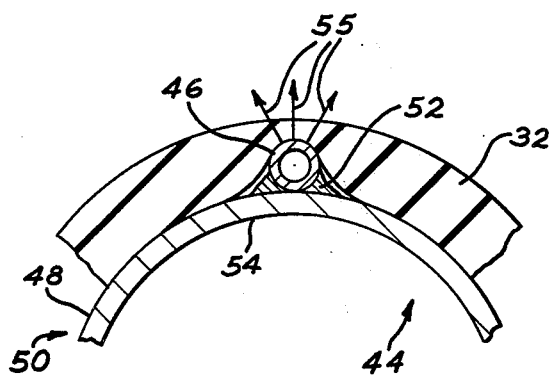
FIG. 3 is a greatly enlarged cross-sectional view of a prior art suction line/capillary tube assembly wherein the capillary tube is soldered to the outside of the suction line.

Referring next to FIG. 3, there is illustrated a greatly enlarged fragmented cross-sectional view of a prior art suction line/capillary tube assembly 44 wherein a copper capillary tube 46, similar to the capillary tube 18 of FIGS. 1 and 2, is longitudinally soldered to the exterior surface 48 of a copper suction line 50. The solder is designated 52. The thermal insulation material 32 surrounds appropriate portions of the assembly 44. Due to the direct bond between the capillary tube 46 and the suction line 50, and resultant good thermal contact therebetween, the entire suction line 50, particularly the interior surface 54 thereof, provides efficient heat exchange with the cold gaseous refrigerant passing through the suction line 50. However, as represented by arrows 55, not all the heat of the capillary tube 46 flows to the cool gaseous refrigerant. Some of the heat escapes through the insulation 32 into the surrounding ambient. As explained hereinabove, this heat leakage, since the ambient is generally warmer than the cool suction line gas, results in the capillary tube 46 not being cooled as much as it might be. Additionally, in those refrigerator cabinets where the suction line/capillary tube assembly 44 passes in part through the insulation space between the inner refrigerator liner and the outer cabinet, some of the heat loss represented by the arrows 55 may flow through the inner liner into the refrigerated food storage space, thus placing an additional unnecessary heat load on the refrigeration system.

Figure 4:
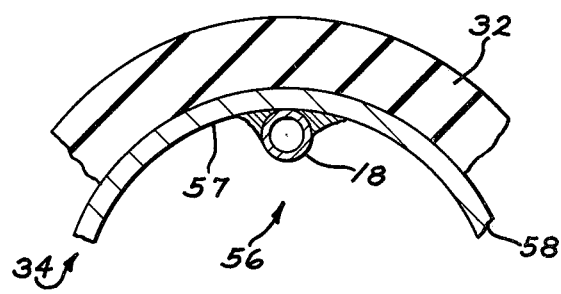
FIG. 4 is a greatly enlarged partial section taken along line IV—IV of FIG. 2, showing an assembly according to a first embodiment of the present invention wherein the capillary tube is soldered to the inside surface of the suction line.

Referring now to FIG. 4, a sectional view taken along line IV—IV of FIG. 2 illustrates a suction line/capillary tube assembly 56 contemplated by a first specific embodiment of the present invention. In the FIG. 4 embodiment, the midsection 34 of the suction line 24 is formed of copper and the capillary tube 18 is soldered to the interior surface 57 of the suction line wall 58 along substantially the entire length of the suction line/capillary tube assembly 30. In operation, the assembly 56 provides good heat exchange between the warm capillary tube 18 and the gaseous refrigerant carried by the suction line due to effective employment of the entire interior surface 57 of the suction line midsection 34. Additionally, heat loss from the capillary tube 18 directly to the ambient, unlike in the prior art FIG. 3 assembly, is eliminated. This results in increased efficiency due to elimination of the two effects mentioned above with reference to FIG. 3.

Figure 5:
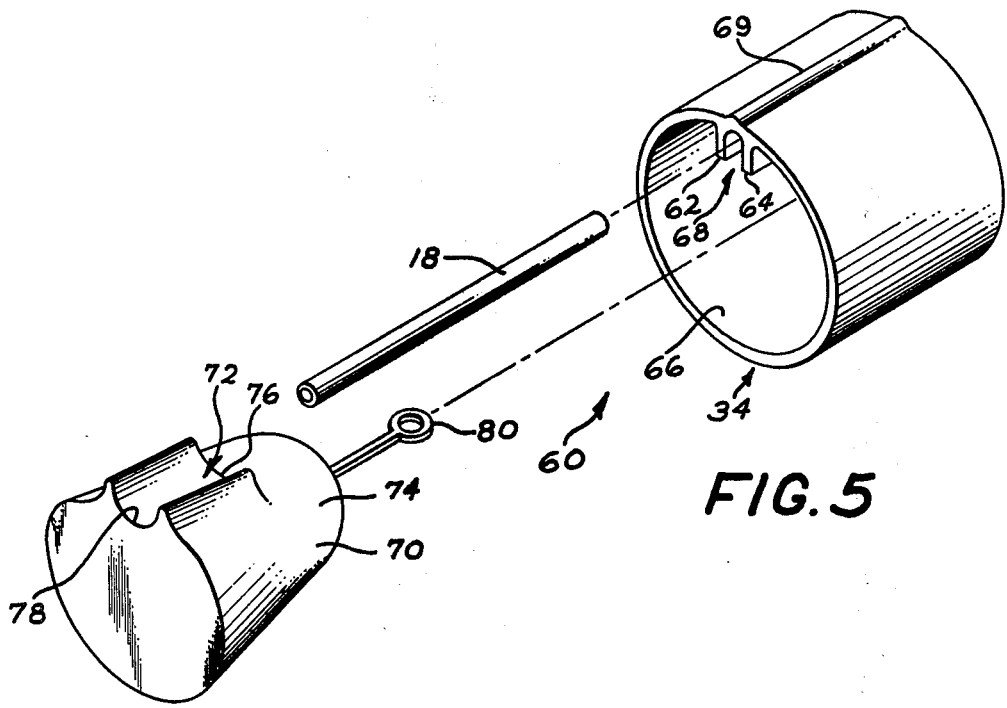
FIG. 5 is an exploded perspective view showing a second embodiment of the invention prior to assembly thereof and additionally illustrating a method of assembly.
Figure 6:
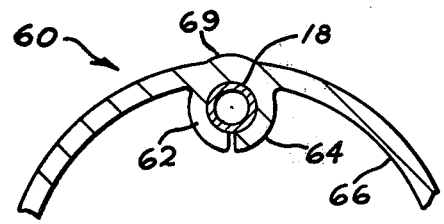
FIG. 6 is an enlarged cross-sectional view of the second embodiment of the invention shown fully assembled.

Referring next to FIGS. 5 and 6, there is shown a suction line/capillary tube assembly 60 contemplated by a second embodiment of the present invention, FIG. 5 being an exploded view prior to assembly and illustrating a method of assembly, and FIG. 6 being a cross-sectional view, similar to FIG. 4, of the completed assembly 60. In FIGS. 5 and 6, the optional thermal insulation material 32 (FIGS. 1–4) is omitted for clarity of illustration.

In the assembly 60, the midsection 34 of the suction line 24 includes a pair of longitudinal ridges 62 and 64 extending from the interior surface 66 of the suction line midsection 34 generally toward the center of the line, forming an internal channel 68 therebetween. In the undeformed condition of the ridges 62 and 64 illustrated in FIG. 5, it will be seen that the ridges 62 and 64, together with the portion of suction line interior surface 66 therebetween, cooperate to define a generally U-shaped channel. As indicated in the exploded FIG. 5 view, the capillary tube 18 is positioned within the channel 68. Next, the ridges 62 and 64 are deformed toward each other so as to substantially surround the capillary tube 18 in good heat exchange relationship, producing the configuration of FIG. 6. In order to positively locate the otherwise hidden internal channel 68, particularly when automated tube handling equipment is employed, a neutral axis locator ridge 69 is formed on the exterior of the line midsection 34.

In a particular method of providing or manufacturing the assembly 60 of FIGS. 5 and 6, a closure tool 70 is employed. The closure tool 70 includes a channel 72 of tapering width formed on the exterior surface 74 thereof. The tool channel 72 includes a wider end 76 and a narrower end 78. After the capillary tube 18 has been placed within the internal channel 68, the ridges 62 and 64 are deformed by forcing the closure tool 70 through the suction line section 34, orienting the tool 70 so that the ridges 62 and 64 enter the wider end 76 of the tool channel in undeformed condition and emerge from the narrower end 78 in the deformed condition, the end result being the assembly 60 as illustrated in FIG. 6. While any suitable means may be employed for forcing the closure tool 70 through the suction line 34, in FIG. 5 the tool 70 is shown as having a general bullet shape with a projection 80 on the front thereof for pulling it through the tube 34.

It will be appreciated that the operation of the suction line/capillary tube assembly 60 of FIGS. 5 and 6 is similar to that of the assembly 56 of FIG. 4 and has similar efficiency advantages. The assembly 60 has the further advantage that the suction line section 34 may be formed of aluminum, even though the capillary tube 18 is copper, to atmospheric moisture and a metallurgical bond is not required.

Figure 7:
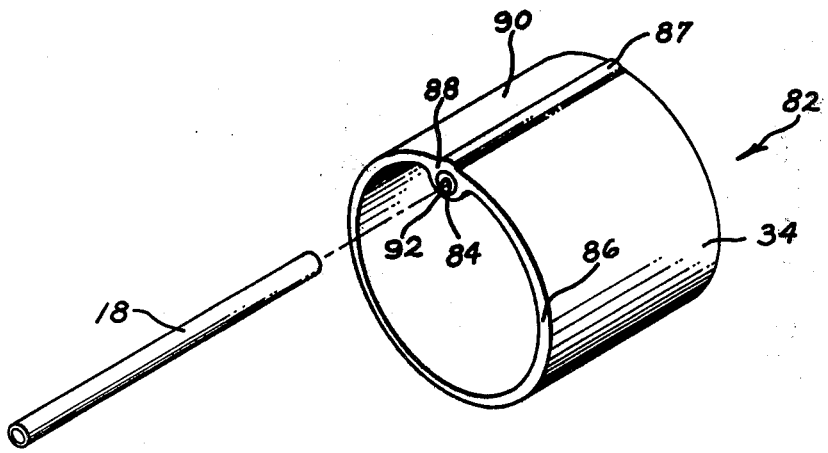
FIG. 7 is an exploded perspective view showing a third embodiment of the invention.

Referring lastly to FIG. 7, there is shown a suction line/capillary tube assembly 82 according to a third embodiment of the invention. In the assembly 82, a longitudinal bore 84 is formed in the wall 86 of the suction line section 34. As in FIG. 5, the line midsection 34 of FIG. 7 includes a neutral axis locater ridge 87 to positively reference the bore 84. The capillary tube 18 is snugly positioned within the bore 84 for good thermal contact with the walls of the suction line midsection 34. It is preferable that the wall section 88 between the bore 84 and the outer surface 90 of the midsection 34 be thicker than the wall portion 92 between the longitudinal bore 84 and the interior of the midsection 34. This assures that the capillary tube 18 can be mechanically urged into good thermal contact with the tube midsection 34. It will be appreciated that whichever material, aluminum or copper, is used for the midsection 34, it is of sufficiently high thermal conductivity so that any heat produced in the vicinity of the bore 84 is quickly conducted to substantially all portions of the suction line wall 86, avoiding any concentration of heat.

In an exemplary method for constructing the assembly 82, the bore 84 and the capillary tube 18 are initially sized for a sufficiently loose fit so that the capillary tube 18 may readily be inserted through the bore 84. Subsequent to this insertion, the bore 84 is partially collapsed by passing a roller or the like along the neutral access locater 87 to bring at least a portion of the interior wall of the bore 84 in direct contact with the capillary tube 18.

An alternative method of partially collapsing the bore 84 for good thermal contact with the capillary tube 18 is to pass a suitable tool, for example a closure tool similar to the tool 70 (FIG. 5), through the suction line 34.

The operation and efficiency advantages of the assembly 82 are similar to those of the previously-described devices 56 and 60 and therefore will not be repeated.

It will be appreciated that in the assembly 82, the junction between the suction line section 34 and the capillary tube 18 is protected from the atmosphere and particularly from moisture carried therein. Therefore, if desired, a lower-cost aluminum suction line may be employed and not pose a material compatibility problem with the capillary tube 18. It will further be appreciated that occasional breaks or interruptions in the wall portion 92 between the bore 84 and the line interior present no particular problem, as the result would be equivalent to the embodiment of FIG. 6.

It will be apparent therefore that the present invention provides high-efficiency suction line/capillary tube heat exchange in a refrigeration system and may be used even when employing dissimilar metals for the capillary tube and the suction line. Further, methods of manufacturing particular embodiments have been shown and described.

While specific embodiments of the invention have been illustrated and described herein, it is realized that modifications and changes will occur to those skilled in the art. It is therefore to be understood that the appended claims are intended to cover all such modifications and changes as fall within the true spirit and scope of the invention.

What is claimed is:

1. A method for providing heat exchange between the capillary tube and suction line of a refrigeration system, which method comprises:
    providing a suction line having a pair of longitudinal ridges extending from the interior surface of the line toward the center of the line and cooperating with the portion of the interior surface therebetween to form a generally U-shaped internal channel of at least approximately two feet in length;
    placing the capillary tube within the U-shaped internal channel along at least approximately two feet thereof; and
    deforming the ridges so that the ridges substantially surround the capillary tube by forcing a closure tool having a tool channel of tapering width on the exterior surface thereof through the suction line, orienting said tool so that the ridges enter the wider end of the tool channel in undeformed condition and emerge from the narrower end of the tool channel in deformed condition.

2. The method of claim 1 wherein the suction line has a locator ridge on the exterior surface along the U-shaped internal channel.

3. The method of claim 1, wherein the closure tool is bullet-shaped with one end being of less diameter than the opposite end and the wider end of the tool channel is located at the lesser diameter end of the tool.

4. The method of claim 3 wherein the lesser diameter end of the tool has a projection on the front thereof for pulling the tool through the suction line.

* * * * *